United States Patent [19]

Pastor

[11] Patent Number: 4,543,619
[45] Date of Patent: Sep. 24, 1985

[54] MAGNETIC DISK CARTRIDGE AND DISK DRIVE

[75] Inventor: Sheldon L. Pastor, St. Paul, Minn.

[73] Assignee: Minnesota Mining and Manufacturing Company, St. Paul, Minn.

[21] Appl. No.: 430,819

[22] Filed: Sep. 30, 1982

[51] Int. Cl.⁴ .................... G11B 5/012; G11B 23/02; G11B 15/04; G11B 19/04
[52] U.S. Cl. ..................................... 360/97; 360/133; 360/60
[58] Field of Search .................... 360/97–99, 360/133, 137, 60, 104; 206/444

[56] References Cited

U.S. PATENT DOCUMENTS

| | | | |
|---|---|---|---|
| 4,301,486 | 11/1981 | Brown et al. | 360/99 |
| 4,464,692 | 8/1984 | Yoshida et al. | 360/133 |
| 4,464,693 | 8/1984 | Gerfast | 360/133 |

*Primary Examiner*—John H. Wolff
*Attorney, Agent, or Firm*—Donald M. Sell; James A. Smith; David W. Anderson

[57] ABSTRACT

A protective cartridge and drive mechanism for use with a stretched surface recording (SSR) disk. The cartridge encloses the disk and includes a rotary locking mechanism which forces the disk into sealing engagement with the cartridge and an erasure preventative control lever which may be manually operated from outside the cartridge. The drive mechanism includes apparatus which releases the cartridge locking mechanism, a sensor which detects the position of the cartridge control lever and operates to prevent the erasure of material recorded on the disk, and two magnetic transducer heads diametrically spaced with respect to the disk which allow random access to recorded information and switching between information recorded at two locations on the disk without the introduction of interference or receiver screen blanking during switching.

18 Claims, 22 Drawing Figures

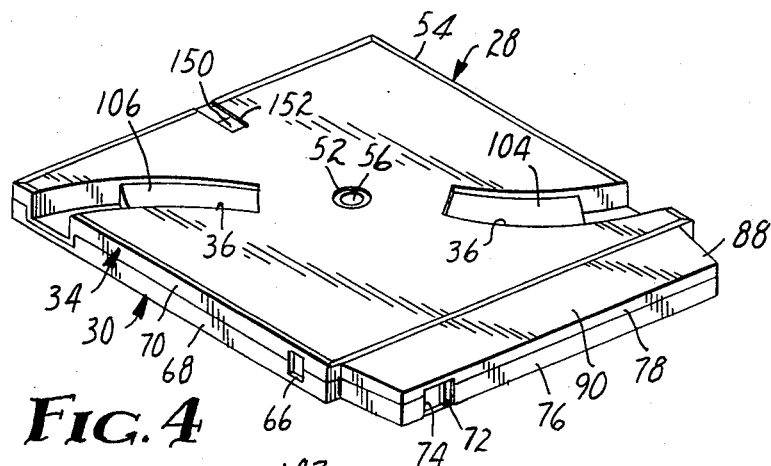
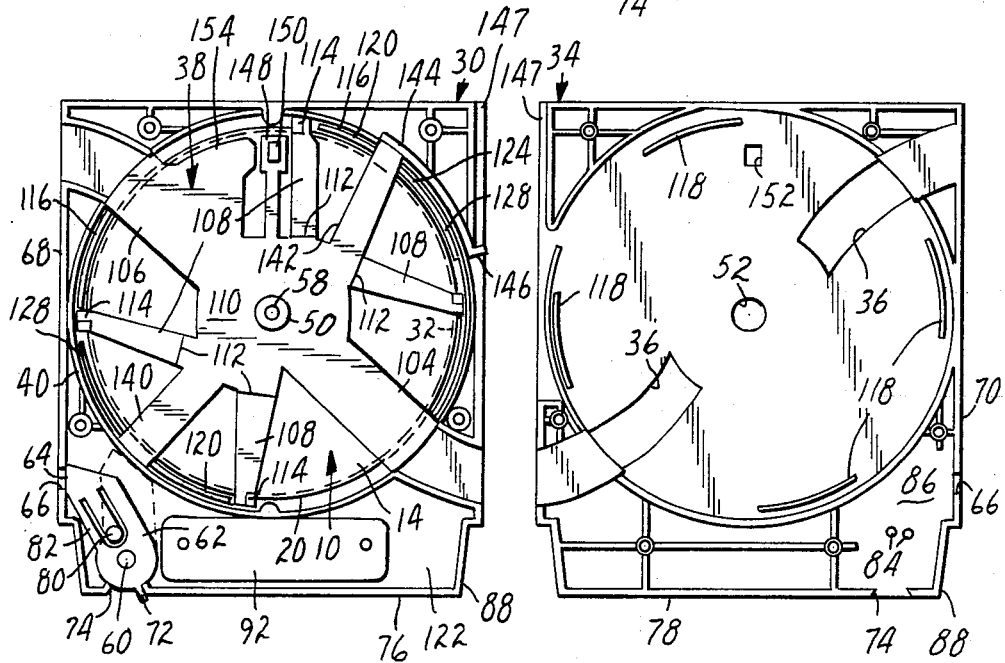
FIG. 4
FIG. 5     FIG. 6

MAGNETIC DISK CARTRIDGE AND DISK DRIVE

BACKGROUND OF THE INVENTION

1. Technical Field of the Invention

This invention relates to magnetic recording cartridges and transport mechanisms, and, in particular, to a cartridge and a disk drive for use in conjunction with a stretched surface magnetic recording disk.

2. Description of the Prior Art

Conventional commercially available magnetic recording tape systems have excellent fidelity characteristics, are durable and are relatively inexpensive. The main shortcoming of tape systems is that access to different portions of the tape requires a relatively large amount of time to search lengthwise of the tape.

A magnetic recording disk configuration, on the other hand, will allow random access to different portions of the recorded material since all of it is available on one plane. In addition, a plurality of magnetic transducer heads may be used in conjunction with a disk to provide rapid access to random portions of the material recorded on the disk.

Several types of recording disk configurations are either presently in use, such as the rigid and "floppy" disks used in association with computers, or proposed for such use, such as the so-called stretched surface recording (SSR) disks, one configuration of which is disclosed in U.S. Pat. No. 3,373,413 issued Mar. 12, 1968 to Treseder.

An SSR disk typically includes a concave base having a rim across which is stretched a recording medium, such as polyethylene terephthalate polymer (Mylar), coated with iron oxide. The use of an iron oxide coated polymeric material is desirable because inexpensive standard magnetic transducer heads may be used to record or read information, and stretching the polymeric material is desirable to provide an optically flat surface which may be deformed slightly to conform to the transducer head and irregularities in the surface of the head. Since the recording medium consists of a thin, taut iron oxide coated polymeric film, SSR disks are particularly vulnerable to damage from environmental contaminants, mishandling and user abuse. While much effort has been expended in the development of SSR disks, very little consideration has been given to the problems of protecting the disk and recording medium from physical damage and protecting and improving accessing to the information contained on the recording medium.

This disclosure addresses the problem of protecting magnetic recording disks in general and SSR disks in particular by providing a cartridge which encloses the disk, not only during storage, but also during operation and an SSR disk drive which accepts the cartridge and provides the mechanical apparatus necessary to access the SSR surface in the cartridge.

Ideally, a protective cartridge for a magnetic disk should provide means for locking the disk in place within the cartridge to provide protection from abuse and mishandling, isolating the disk from environmental contaminants when outside the drive mechanism, protecting the disk surface from contact by the user and protecting the recorded material itself from accidental erasure. In addition, in the drive, the cartridge must release the disk for rotation and provide access to the recording surface by a magnetic transducer head or heads. The drive mechanism must provide apparatus which acts in cooperation with the cartridge to fulfill the above requirements.

SUMMARY OF THE INVENTION

The present invention accomplishes the desired physical protection of a magnetic recording disk by providing a disk cartridge and a disk drive mechanism which act in cooperation to protect the disk from environmental contaminants and abuse when removed from the drive and to free the disk for rotation and provide access of recording transducer heads to the recording surface when the cartridge is placed in the disk drive.

The structure of the disk cartridge includes a lower shell which has an aperture which provides access to the underside of the disk by a disk drive turntable and seals against the base of the disk. An upper shell overlies the lower shell and contains the disk. The upper shell includes two opposed transducer head slots and a cam surface which opposes a cam surface formed in the lower shell adjacent the aperture to define a camming channel. Disposed between the upper shell and the recording disk is a rotatable locking spider which includes flexible arms extending into the camming channel and movable by the cam surfaces upon rotation of the spider to lock the disk in its sealing relationship with the lower shell aperture. The rotatable spider further includes transducer head slot covers which move in response to rotation of the spider to seal or open the upper shell head slots. A resilient latch button on the spider enters an aperture in the upper shell to lock the spider in the position in which the disk is held against the lower shell aperture and the head access slots are sealed.

To protect the information recorded on the disk, the cartridge includes an erasure and recording lock lever which is visible and operable while the cartridge is in the disk drive mechanism to present a reflective surface to a phototransducer located within the disk drive mechanism. Detection of the reflective surface either prevents or permits erasure and recordation of information on the disk. The electronics associated with the phototransducer may be arranged to accomplish either function.

Finally, to access the information recorded on the disk, the disk drive mechanism, into which the cartridge is inserted, is further provided with a turntable which has a spring loaded drive pin for engaging and rotating the disk, two transducer heads mounted on rotary arms driven by stepper motors for recording or reading information on the disk, engagement studs which contacts a spider lever and rotate the spider upon insertion or removal and a pressure arm which forces the recording disk into contact with the turntable and which includes a release pin which engages the latch button to permit rotation of the spider upon insertion of the cartridge into the drive mechanism.

BRIEF DESCRIPTION OF THE DRAWINGS

The present invention will be more thoroughly described with reference to the accompanying drawings wherein like numbers refer to like parts in the several views, and wherein:

FIG. 4 is a perspective view of the assembled cartridge of FIG. 3;

FIG. 5 is a plan view of the cartridge of FIG. 4 having the upper shell of the housing removed to illustrate structural details and illustrating an alternate position of an erasure and recording lock lever in phantom lines;

FIG. 6 is a bottom plan view showing the interior of the cartridge upper shell;

DETAILED DESCRIPTION

Figure 1:
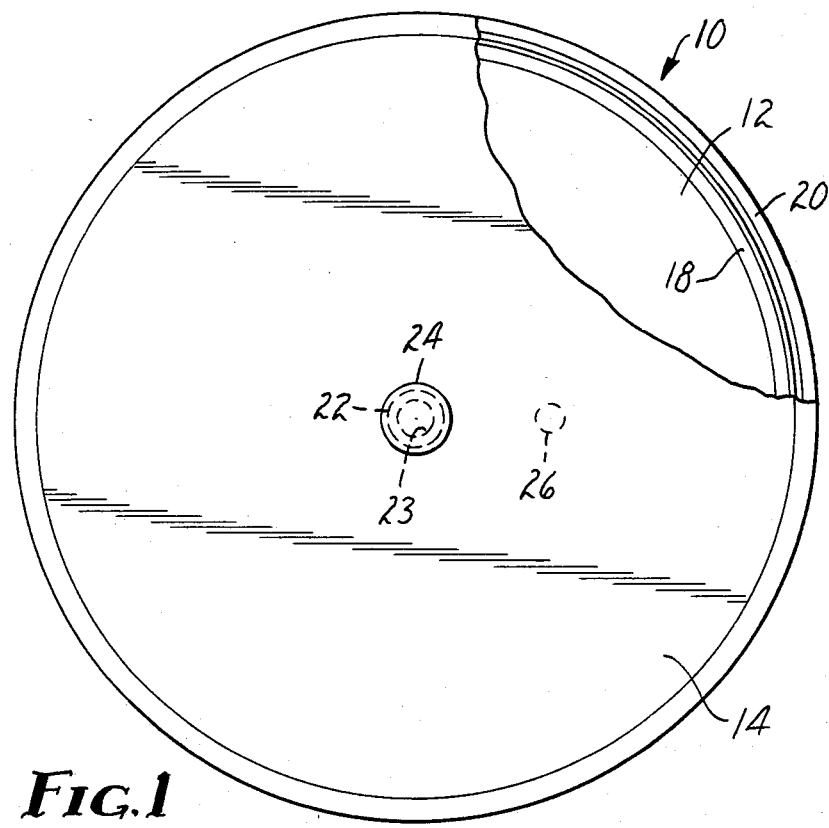
FIG. 1 is a plan view of a stretched surface recording (SSR) disk having a section removed to illustrate interior details.

Referring now to the drawings, and, in particular, FIG. 1, there is shown a stretched surface recording (SSR) disk generally indicated as 10, which includes a base 12 and a film covering 14. This particular form of recording medium is not essential to the invention since the instant invention may be practiced with other recording mediums such as rigid or flexible disks. However, the SSR disk 10 is the preferred recording medium and will be referred to throughout this description. It is, therefore, considered essential that a basic description of the structural details of the SSR disk be undertaken.

Figure 2:
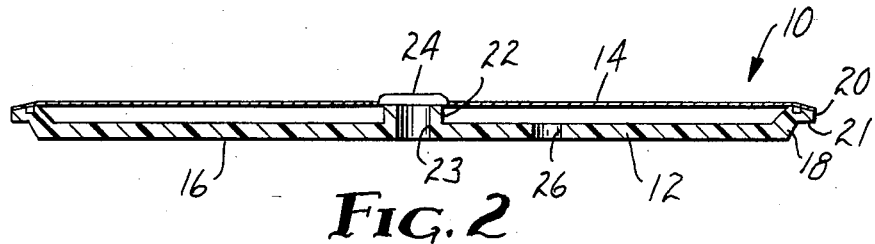
FIG. 2 is a diametrical cross-sectional of the disk of FIG. 1.

As best seen in FIG. 2, the base 12 is concave in shape and includes a flat, circular support plate 16 terminating in an angled upstanding wall 18 which, in turn, terminates in a rim 20 to which is attached the film 14. The rim 20 has a lower flat peripheral surface 21 which extends parallel to the support plate 16. Central to the disk 10 is a boss 22 which includes a spindle hole 23 and to which is attached a bearing surface 24 for a purpose to be described below. The support plate 16 also includes an off-center drive hole 26 which is used in conjunction with a turntable drive pin to rotate the disk 10 in a manner also to be described below.

Assembly of the SSR disk 10 is accomplished by stretching the film 14 across the rim 20 and attaching the film 14 thereto by any suitable conventional means such as ultrasonic welding or adhesive bonding. The film may be a thin sheet of iron oxide coated polyethylene terephthalate polymer (Mylar) which, when stretched, provides a flat surface which will conform slightly to an information recording and retrieval device such as a conventional magnetic transducer head.

Figure 3:
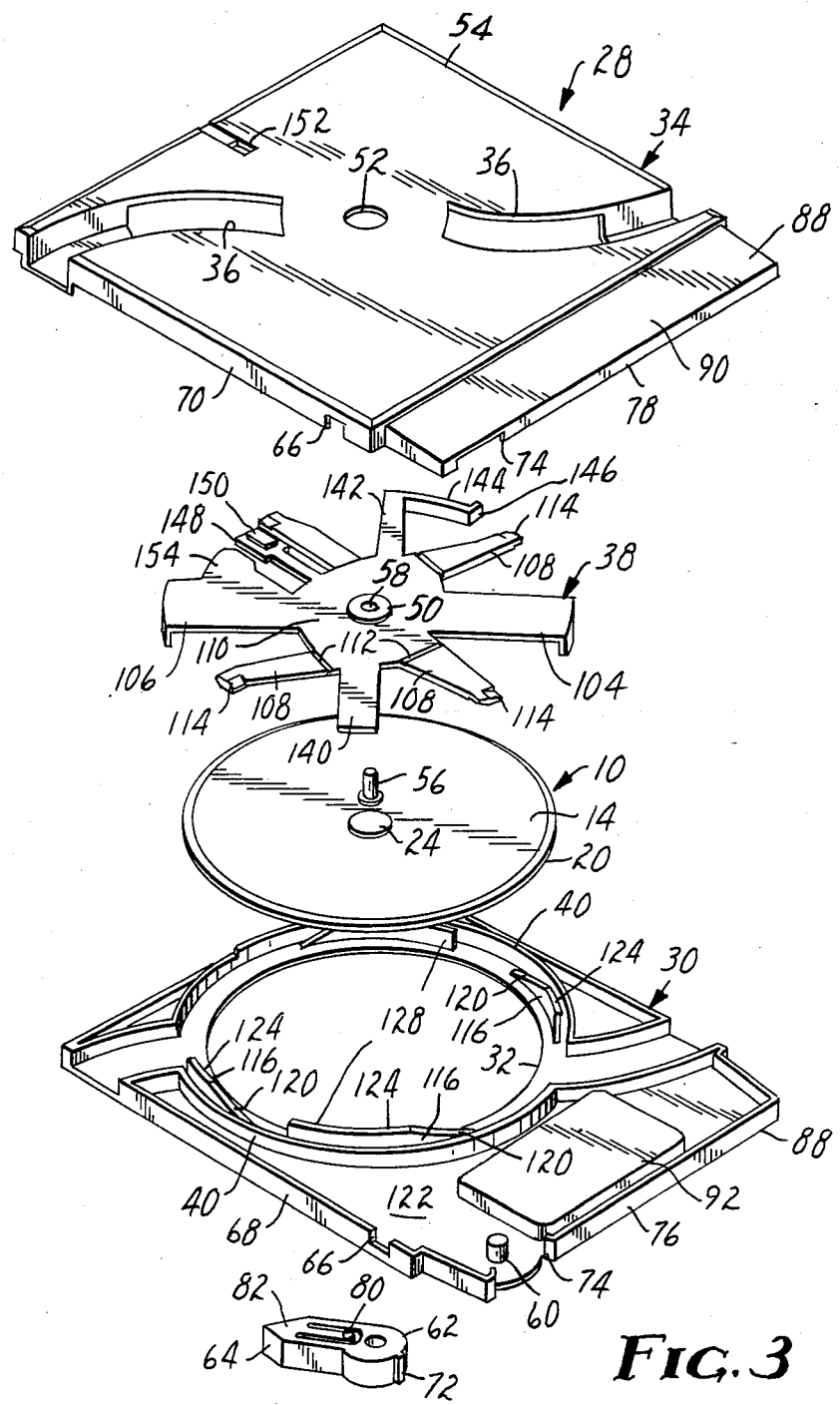
FIG. 3 is an exploded perspective view of an SSR cartridge and disk assembly according to the present invention.

The SSR disk 10 is used in conjunction with a cartridge generally indicated as 28 in FIG. 3 which includes a lower shell 30 which has an aperture 32 which receives the angled wall 18 of the disk 10, an upper shell 34 which includes arcuate slots 36 providing access to the disk 10 and a rotatable locking spider 38 interposed between the SSR disk 10 and the upper shell 34. The spider 38 is maintained centered with respect to the upper shell 34 by means of a secondary lower shell wall 40 and/or a spider bearing 50 which extends through a hole 52 in the upper shell 34 to the outer surface 54 of the upper shell 34. A pin 56 extends through a hole 58 defined by the bearing 50 for a purpose to be described below.

Located within the lower shell 30 is a pin 60 which rotatably supports an erasure and recording lock lever 62. The lever 62 includes a reflective surface 64 which may be viewed through an aperture 66 which pierces a lower shell side wall 68 and an upper shell side wall 70. The lever 62 is movable between positions wherein the reflective surface 64 is adjacent to the aperture 66 and wherein the reflective surface 64 is removed from the aperture 66 and not visible. The lever 62 may be moved by means of a grip 72 which projects through an opening 74 in the front walls 76 and 78 of the upper and lower shells 34 and 30.

As is best seen in FIGS. 5 and 6, the lever 62 is maintained in either of its two positions by a cantilevered detent 80 located on the upper surface 82 of the lever 62 which enters either of two detent recesses 84 located in the inner surface 86 of the upper shell 34. When the reflective surface 64 is in the position adjacent the aperture 66, the reflective surface 64 may be viewed by an auxiliary photoelectric device (not shown) which provides a signal which will either prevent or permit the erasure of information on the disk 10 and the recordation of new information depending upon the arrangement of the electronic circuits associated with the photoelectric device.

FIG. 4 shows the shells 30 and 34 assembled to form the cartridge 28 which is generally square in configuration, but includes a protruding gripping area 88 formed by a sloped outer surface 90 of the upper shell 34 and a finger-grip recess 92 which is best seen in FIGS. 3 and 5.

Figure 20:
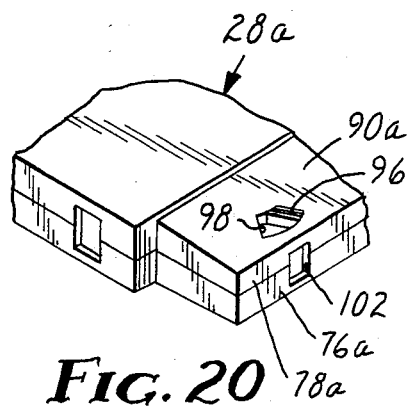
FIG. 20 is a partial perspective view of a cartridge embodying an alternate erasure and recording lock lever.
Figure 21:
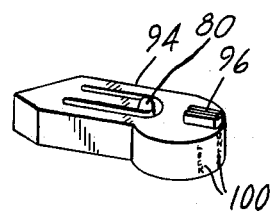
FIG. 21 is a perspective view of the lock lever of FIG. 20.

An alternate embodiment of an erasure and recording lock lever 94 shown in FIGS. 20 and 21 which operates identically to the lever 62 described above except that the lever 94 is moved between its two positions by means of a grip 96 which extends through an arcuate slot 98 located in a sloped forward surface 90a of a cartridge 28a. The lever 96 also includes legends 100 which may be viewed through an aperture 102 located in the front walls 76a and 78a of the cartridge 28a. Apart from the slot 98 and the aperture 102, the cartridge 28a is identical to the cartridge 28 described above.

Unlike erasure locks associated with audio cassettes or linear video tape cassettes, the lock levers 62 or 94 may be moved and viewed while the cartridges 28 or 28a are in the drive mechanism and may be operated between their positions an indefinite number of times. Although use of a reflective surface 64 is preferred, the levers 62 or 94 could be used to position a magnet near or away from a sensing device in the drive or could interact mechanically with the drive.

FIGS. 5-10 illustrate the workings of the spider 38 which is rotatable and performs a number of functions relative to sealing the cartridge 28 from environmental contaminants and locking the disk 10 adjacent the lower shell 30 to reduce or prevent damage due to mishandling or abuse.

FIG. 5 is a top view of the cartridge 28 with the upper shell 34 removed and illustrates the spider 38 in a position which would be normal for storage when the cartridge 28 is removed from its associated drive mechanism. This position of the spider 38 will be denoted the "sealed" position because the spider 38 acts to force the peripheral surface 21 of the disk rim 20 against the lower shell 30 adjacent the aperture 32, thus closing off the aperture 32, and because diametrically opposed slot covers 104 and 106 are positioned to close the arcuate slots 36 formed in the upper shell 34.

Figure 7:
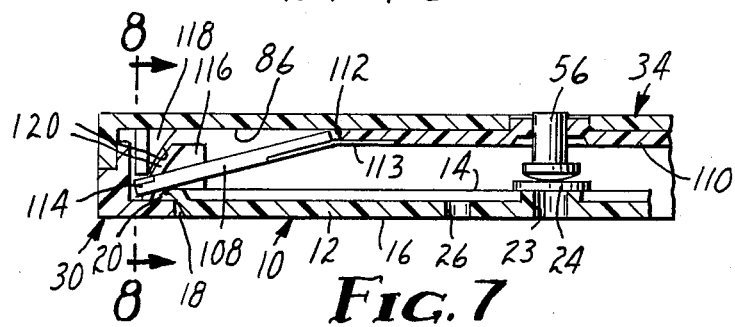
FIG. 7 is a partial transverse cross-sectional view of the cartridge of FIG. 4 illustrating a flexible arm of a rotatable locking spider positioned to lock the disk within the cartridge.
Figure 9:
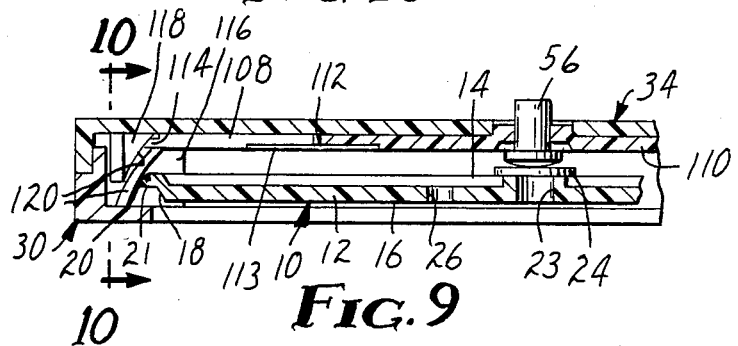
FIG. 9 is a partial transverse cross-sectional view of the cartridge illustrating the spider and flexible arm in the disk release position.

To lock the disk 10 into sealing relationship with the aperture 32, there are included four flexible arms 108 which extend from a central body portion 110 of the spider 38 to contact the rim 20 of the disk 10 at areas separated by approximately 90°. Flexibility of the arms 108 may be provided by the natural resiliency of the material if the spider 38 is formed of plastic, or may be provided by reducing the cross-section of the arms 108 adjacent the body portion 110 by adding score lines 112 in the arms 108. Alternatively, the arms 108 may be severed at the lines 112 and reconnected by means of thin, flexible sheet material 113 bonded to either side of the break as best illustrated in FIGS. 7 and 9. The arms 108 must be flexible because the central portion 110 of the spider 38 is maintained against the inner surface 86 of the upper shell 34 at all times while the tips 114 of the arms 108 move from a position adjacent the inner surface 86 of the upper shell 34 when the spider 38 is in its open configuration to a position adjacent the lower shell 30 when the spider is rotated approximately 30° to its sealed position.

This vertical movement of the tips 114 of the flexible arms 108 is produced by four cams 116 surrounding the lower shell aperture 32 and four opposed cams 118 located on the inner surface 86 of the upper shell 34.

At this point, it should be noted that although reference has been made to four flexible arms 108, four cams 116 and four cams 118 associated with the lower and upper shells 30 and 34, a lesser or greater number of these elements could serve the purpose as well. It is desirable that the arms 108 and cams 116, 118 be evenly placed around the rim 20 of the disk 10 so that balanced forces will be produced, but the number is not critical. Also, since the cams 116 and 118 are formed consecutively in series, they may be considered to form single cam surfaces associated with the lower 30 and upper 34 shells.

Figure 8:
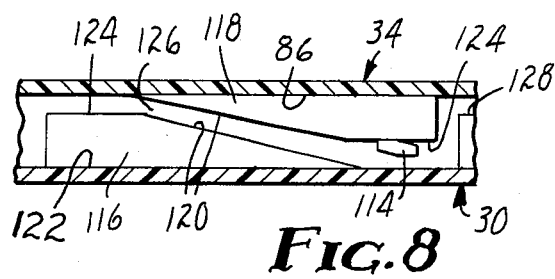
FIG. 8 is a partial vertical sectional view of the cartridge taken generally along the line 8—8 of FIG. 7.
Figure 10:
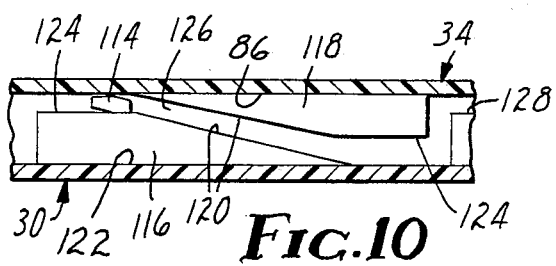
FIG. 10 is a partial vertical sectional view of the cartridge of FIG. 4 taken generally along the line 10—10 of FIG. 9.

As is best seen in FIGS. 3, 8 and 10, the cams 116 or 118 are comprised of ramp portions 120 extending from the inner surface 122 of the lower shell 30 and the inner surface 86 of the upper shell 34 and plateau regions 124 parallel to the inner surfaces 122 and 86 of the lower and upper shells 30 and 34.

As is best seen in FIG. 8 or 10, the cams 116 and 118 of the lower 30 and upper 34 shells oppose each other to form a camming channel 126 therebetween which guides the movement of the tips 114 of the flexible arms 108. FIG. 7 illustrates one flexible arm 108 in the position it will assume when the spider 38 is rotated to the sealed position, which is against the rim 20 of the disk 10 forcing the disk 10 into sealing relationship with the lower shell aperture 32. In operation, the tips 114 of the flexible arms 108 move from the position adjacent the disk rim 20, as illustrated in FIGS. 7 and 8, along the camming channel 126 to a position adjacent the inner surface 86 of the upper shell 34, as illustrated by FIGS. 9 and 10, as the spider 38 is rotated from its sealed position to its open position, thus freeing the disk 10 for vertical movement and rotation.

It should be recognized that the cams 116 associated with the lower shell 30 could be eliminated and the natural resiliency of the arms 108 relied upon to raise the arms 108 to the position adjacent the upper shell 34.

As indicated above, even though the tips 114 of the flexible arms 108 move vertically between the shells 30 and 34 to alternately lock and release the disk 10, the central body portion 110 of the spider 38 remains at all times adjacent the inner surface 86 of the upper shell 34. This is accomplished by means of the plateau regions 124 of the cams 116 associated with the lower shell 30. As best seen in FIG. 3, two diametrically opposed cams 116 include extended plateau regions 128 and the spider 38 includes diametrically opposed positioning arms 140 and 142 corresponding to the extended plateaus 128.

At all rotational positions of the spider 38 the positioning arms 140 and 142 are in contact with the extended plateaus 128 of the lower cams 116, thus supporting the central portion 110 of the spider 38 in a spaced relationship from the lower shell 30 and adjacent the inner surface 86 of the upper shell 34. FIGS. 7 and 9 illustrate that although the flexible arms 108 move vertically within the cartridge 28, the central body portion 110 of the spider 38 remains adjacent the upper shell 34.

One of the positioning arms 142 includes an arcuate extension 144 concentric with the aperture 32 which terminates in a lug 146 exposed in a groove 147 formed in the upper shell 34 and lower shell 30 which is used to rotate the spider 38, as will be explained.

The spider 38 further includes a latch arm 148 which has an integral rectangular latch button 150 formed thereon facing the inner surface 86 of the upper shell 34. The upper shell 34 includes a matching rectangular aperture 152 which is adapted to accept the latch button 150 as the spider 38 is rotated to the sealed position. In the sealed position, the natural resiliency of the latch arm 148 urges the latch button 150 into the aperture 152. The latch button 150 and the aperture 152 are included to latch the spider 38 in the sealed position, thus preventing movement of the disk 10 or access to the disk film 14 when the cartridge 28 is in storage or otherwise removed from its associated drive mechanism.

One of the slot cover arms, arm 106 includes an angularly extending baffle 154 in the plane of the central spider body portion 110 and adjacent the inner surface 86 of the upper shell 34 which closes the rectangular aperture 152 when the spider 38 is in any rotational position other than the sealed position and reinforces the arm 148 should an attempt be made to rotate the spider 38 without releasing the latch button 150 from the aperture 152.

Thus far a cartridge 28 for an SSR disk 10 has been described which, when the spider 38 is rotated to the sealed position, completely seals the SSR disk 10 from environmental contaminants and locks the disk adjacent the cartridge 28 to prevent movement of the disk within the cartridge 28 and, therefore, reduce damage to the disk 10 from user abuse or mishandling. Sealing of the cartridge 28 is accomplished by the slot covers 104 and 106 which prevent access to the disk 10 through the upper shell 34 and by the flexible arms 108 which operate to force the peripheral surface 21 of the disk 10 against the lower shell 30 adjacent the aperture 32. Also, a latch 150 is provided which maintains the spider 38 in the sealed position.

When the spider 38 is rotated by means of the lug 146 to the open position, the arcuate access slots 36 of the upper shell 34 are uncovered to allow access of transducer heads to the disk 10 and the flexible arms 108 are retracted to free the disk 10 for vertical movement within the cartridge 28 and rotation.

Figure 11:
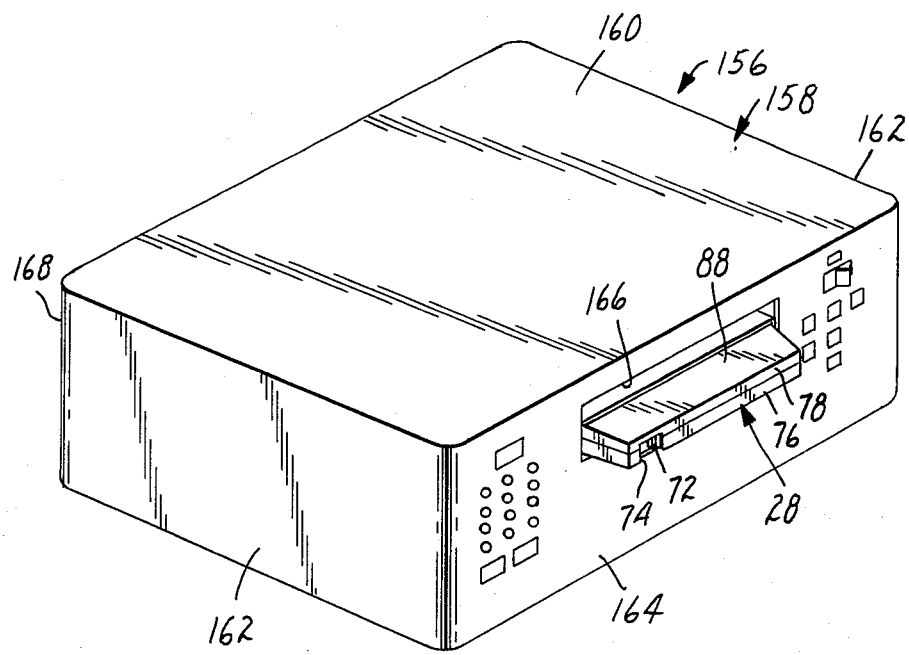
FIG. 11 is a perspective view of a drive mechanism housing according to the present invention having a cartridge inserted therein.

Turning now to a drive mechanism to be used in association with the SSR disk 10 and cartridge 28, there is shown in FIG. 11 a drive mechanism generally indicated as 156 which includes a housing 158 comprised of a housing top panel 160, housing side panels 162 and a housing front panel 164 which includes an aperture 166 into which the cartridge 28 may be inserted lengthwise. While the drive mechanism 156 contains appropriate and conventional electronics for processing information to and from the SSR disk 10, that aspect of the drive mechanism 156 is outside the scope of this disclosure and will not be considered herein. This disclosure is concerned with those mechanical aspects of the drive mechanism 156 which operate in association with the cartridge 28 to provide access to the information located on the film covering 14 of the SSR disk 10.

Figure 12:
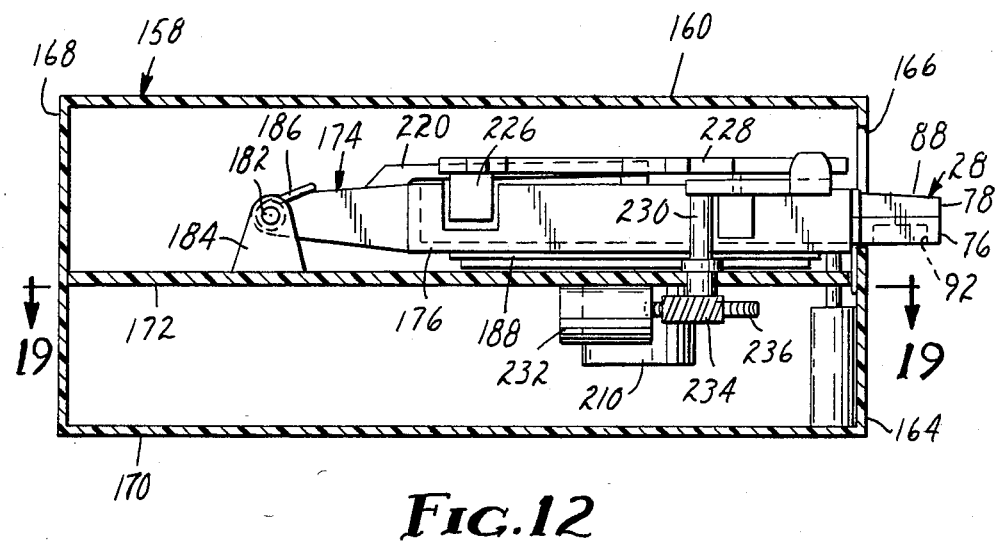
FIG. 12 is a side elevational view of the drive mechanism of FIG. 11 having a housing side removed to illustrate interior details.
Figure 13:
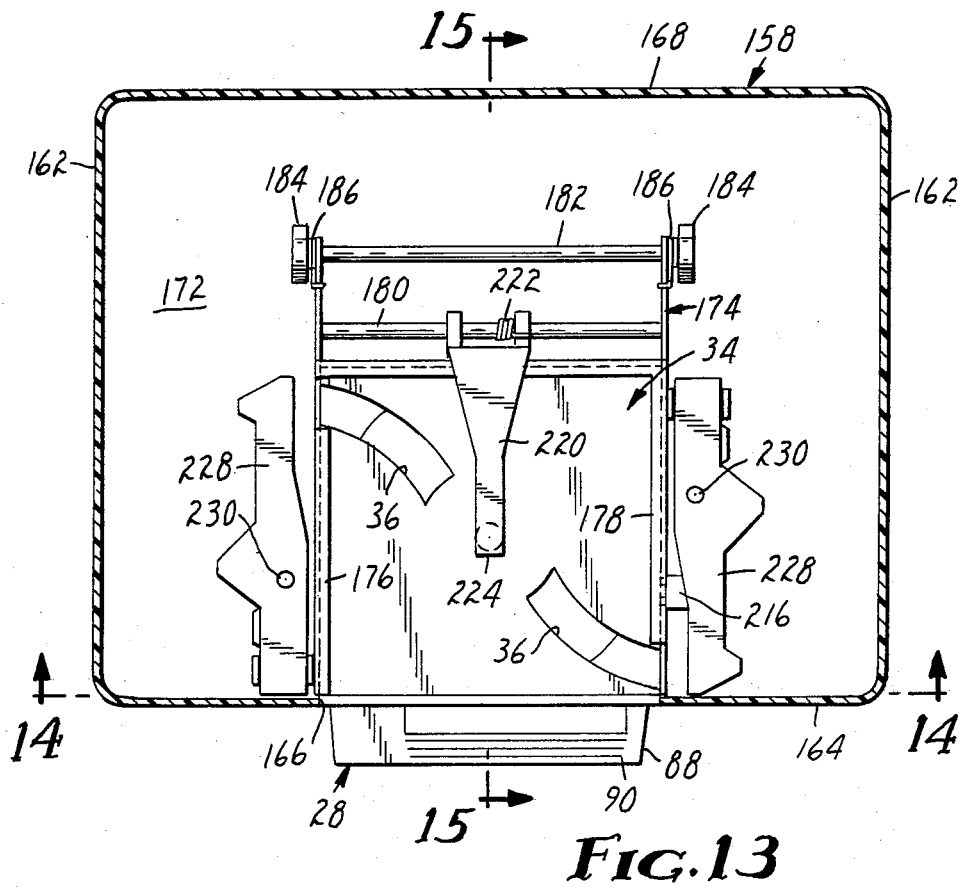
FIG. 13 is a plan view of the drive mechanism of FIG. 11 having the housing top removed to illustrate details and showing two transducer arms in a retracted position.
Figure 14:
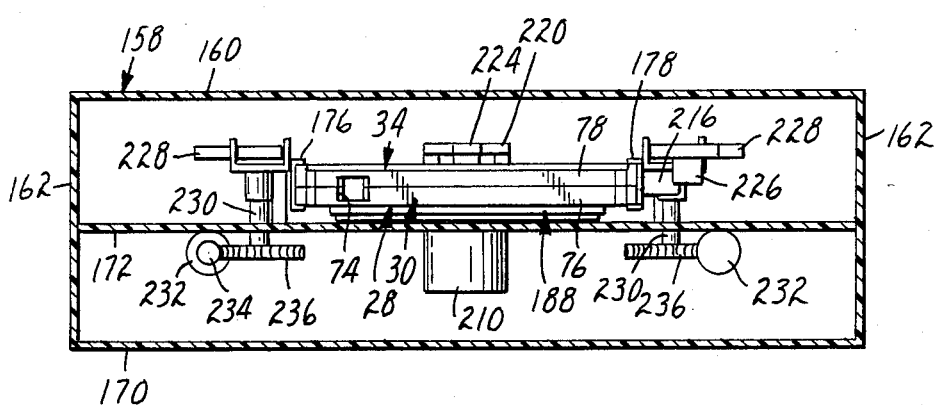
FIG. 14 is a transverse sectional view of the drive mechanism of FIG. 11 taken generally along the line 14—14 of FIG. 13.

Referring to FIG. 12, the housing structure of the drive mechanism 156 is completed by a back panel 168, a bottom panel 170 and an intermediate horizontal panel 172 which divides the housing 158 into two volumes, the upper of which receives the cartridge 28 and the lower of which provides room for the necessary electrical and electronic components.

Figure 15:
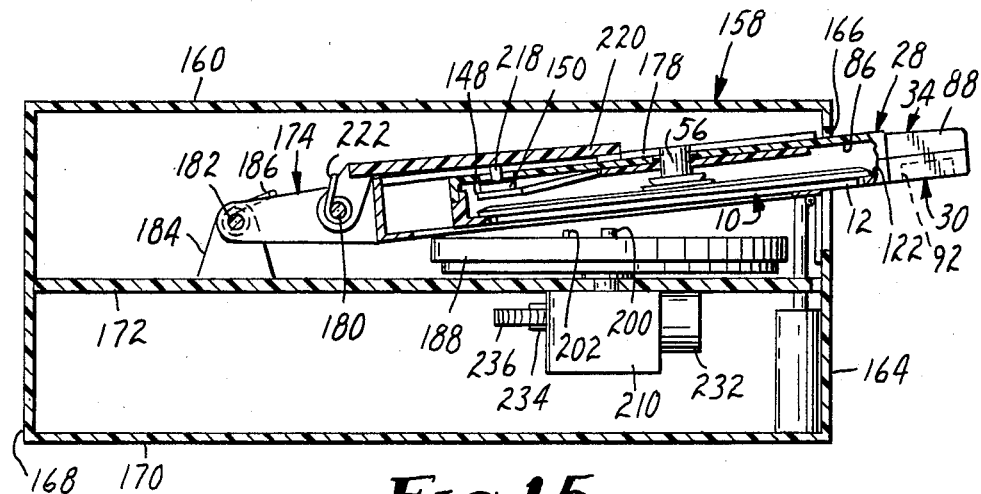
FIG. 15 is a vertical sectional view of the drive mechanism of FIG. 11 taken generally along the line 15—15 of FIG. 13, illustrating the cartridge in the partially inserted position.
Figure 16:
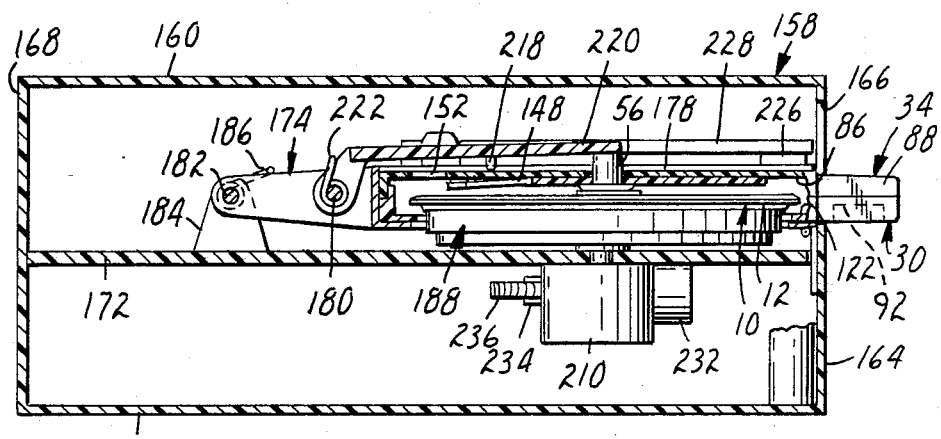
FIG. 16 is a vertical sectional view of the drive mechanism of FIG. 11 taken generally along the line 15—15 of FIG. 13, illustrating the cartridge in the fully inserted position.

Located within the drive mechanism housing 158 is a frame 174 comprised of two cartridge-accepting side channels 176 and 178 connected by a brace 180 and a shaft 182 pivotally mounted on two stationary support structures 184. The frame 174 is biased toward the intermediate panel 172 by torsional springs 186 located adjacent each of the supports 184. The frame 174 must pivot around the shaft 182 so that a partially inserted cartridge 28 may be lifted as shown in FIG. 15 to clear a turntable 188 upon which the exposed surface of the SSR disk base 12 may be positioned.

The turntable 188 includes a central spindle 200 and a drive pin 202 which respectively engage the spindle hole 23 and the drive hole 26 located in the disk base 12.

Figure 17:
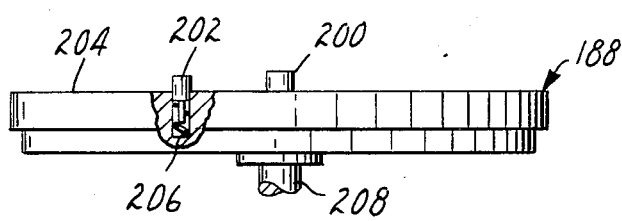
FIG. 17 is an elevational view of a drive turntable associated with the drive mechanism of FIG. 11 having a portion broken away to show structural details.
Figure 18:
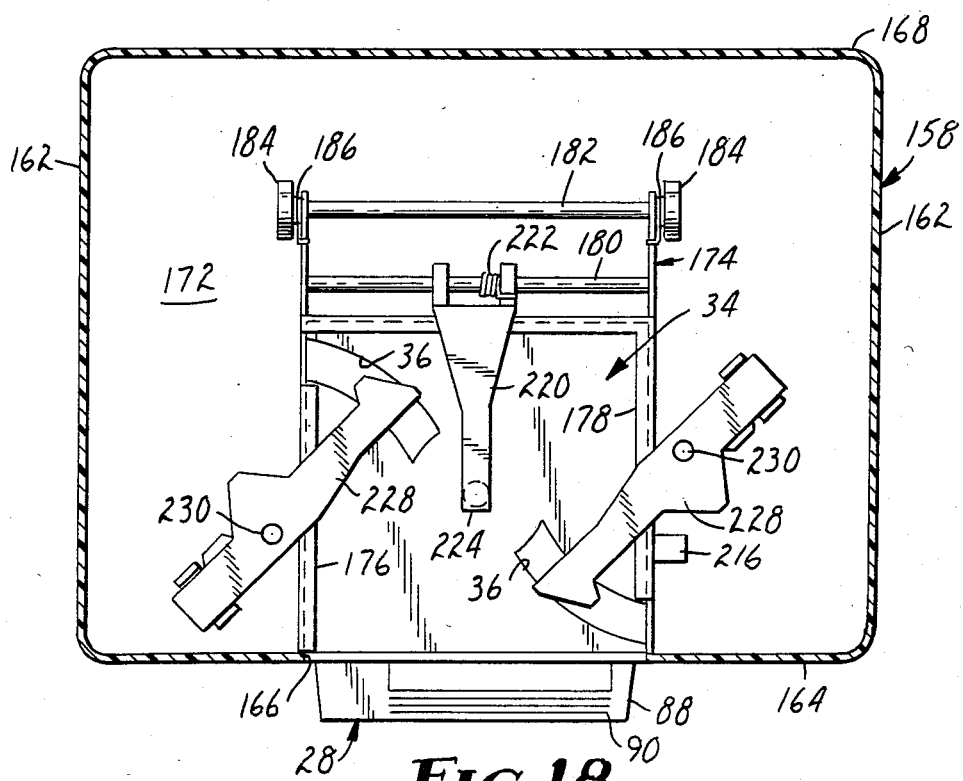
FIG. 18 is a plan view of the drive mechanism of FIG. 11 having the housing top removed and illustrating the transducer heads in an operating position.

FIG. 17 illustrates that the drive pin 202 extends below the surface 204 of the turntable 188 and is spring loaded by a coil spring 206. The coil spring 206 allows the drive pin 202 to retract to the surface 204 of the turntable 188 and engage the disk spindle hole 23 as the turntable 188 is rotated relative to the disk 10. The turntable is supported by a motor shaft 208 which is connected to a drive motor 210 which may be a dual-speed motor to slowly rotate the turntable 188 relative to the disk 10 until the drive pin 202 engages the drive hole 26 and then rotate the turntable 188 and the disk 10 at full operational speed. Alternatively, the turntable 188 may be driven by an auxiliary motor (not shown) which would slowly rotate the turntable 188 until the drive pin 202 is engaged. In this instance, the turntable drive motor 210 may be a single-speed motor.

Figure 18A:
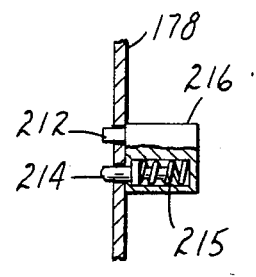
FIG. 18A is an enlarged partial cross-sectional view of a spring housing illustrated in FIG. 18.

In order that the disk 10 be free to rotate, the spider flexible arms 108 must be disengaged from the disk rim 20. As indicated above, this is accomplished by rotating the spider lug 146 in a direction clockwise when viewed from the perspective of FIG. 3 or 5. Rotation of the lug 146 (and the spider 38) is provided by a combination of a stationary stud 212 and a retractable stud 214, both of which are located on the frame channel 178 and best seen in FIG. 18A. The retractable stud 214 has a spherical end surface and is spring loaded 215 so that as the cartridge 28 is inserted into the frame 174, the lug 146 will strike the stud 214 and, because the spider is not free to rotate, cause the stud 214 to retract into a spring housing 216 attached to the channel 178.

The spider 38 and the lug 146 are not free to rotate at this point because they are held in position by the latch button 150 and the upper housing aperture 152.

Located beyond the retractable stud 214 in the direction of insertion of the cartridge 28 into the frame 174, is the stationary stud 212 which engages the spider lug 146 and causes the spider 38 to rotate as the cartridge 28 is further inserted into the drive frame 174. The spider 38 is free to rotate when the stationary stud 212 engages the lug 146 because a release pin 218 on an arm 220 (FIG. 15) releases the latch button 150. The arm 220 is centered with respect to the cartridge 28 and extends from the brace 180. The release pin 218 is located on the arm 220 so as to contact and depress the rectangular latch button 150 just slightly before the lug 146 contacts the stationary stud 212. Since the lug 146 may rotate upon contact with the stationary stud 212, the lug 146 will remain between the stationary stud 212 and retractable stud 214 as the cartridge 28 is fully inserted into the frame 174. As the cartridge 28 is retracted from the frame 174, the lug 146 engages the retractable stud 214 and since the latch button 150 is not in register with the housing aperture 152, the stud 214 will not retract but rather will cause the lug 146 to rotate in a counter-clockwise direction, thus moving the spider 38 to the sealed position and relatching the button 150 in the aperture 152. The cartridge 28 is thus resealed and protected from damage. When the spider 38 has been fully rotated to the sealed position, increasing force on the retractable stud 214 will once again cause the stud 214 to retract, thus freeing the cartridge 28 for removal.

The arm 220 serves another purpose in addition to releasing the spider latch button 150. As shown in FIG.

15, the arm 220 is biased toward the cartridge 28 by a torsional spring 222 connected between the brace 180 and the arm 220. When the cartridge 28 is fully inserted in the frame 174, an end 224 of the arm 220 is positioned over the pin 56 extending beyond the upper shell 34 and exerts a force downward which acts through the bearing surface 24 of the disk 10 to force the disk 10 against the turntable surface 204.

The arm 220 thus maintains the disk 10 in contact with the turntable 188 and maintains the drive pin 202 in engagement with the drive hole 26 located in the disk base 12.

When the cartridge 28 is fully inserted and the disk 10 is being spun by the motor 210, the arcuate slots 36 are uncovered and the film 14 is available to dual magnetic transducer heads 226 located at the ends of rotary arms 228 which pivot about shafts 230 extending through the intermediate panel 172. The heads 226 may be conventional transducer heads used with linear recording tape and the arms 228 are pivoted to provide access to the full surface of the film 14.

Figure 19:
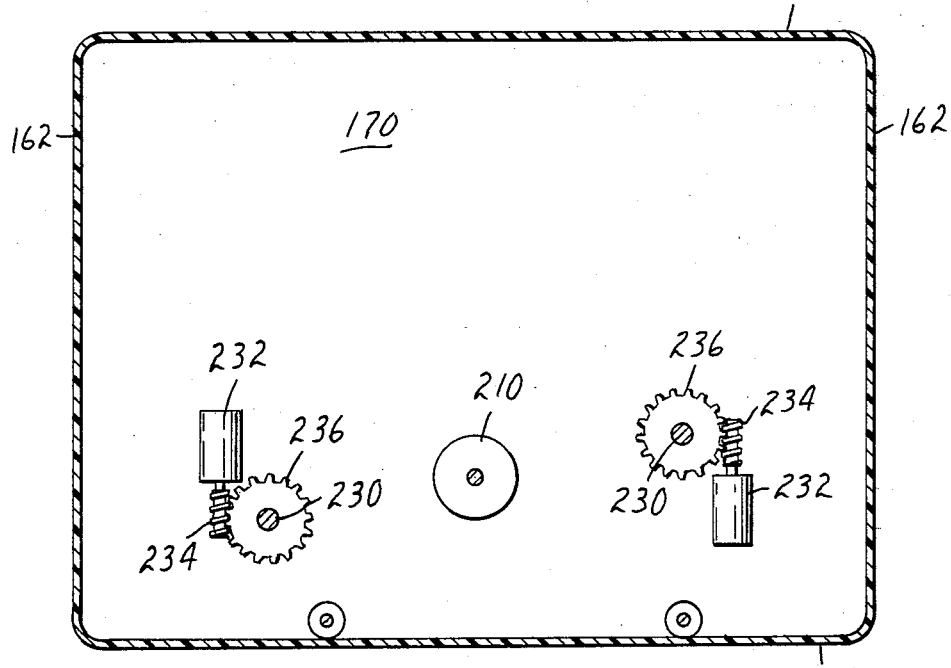
FIG. 19 is a longitudinal sectional view of the drive mechanism of FIG. 11 taken generally along the line 19—19 of FIG. 12 and rotated 90°.

As best seen in FIG. 19, the transducer heads 226 are positioned in the proper radial portion of the film 14 by conventional stepper motors 232 which operate through a worm gear 234 and a spur gear 236 connected to the shaft 230. Rotation of the stepper motors 232 thus results in rotation of the shafts 230 and the rotary arms 228. Rotation of the arms 228 in turn moves the heads 226 radially inward and outward across the surface of the disk film 14.

Two transducer heads 226 are used so that random portions of the disk 10 may be accessed rapidly. The format of information recorded on the disk 10 is 160 concentric discrete tracks, each of which comprises one still video frame. The number of frames has been arbitrarily chosen and corresponds to the number of 35 mm slides contained in two commercially available 35 mm slide projector trays.

Although video information could be recorded in a spiral pattern across the disk 10 and thus produce a continuous television type of playback, this format has been rejected because the amount of information which must be recorded to produce a standard length television broadcast would require a disk 10 of unmanageable size.

The discrete frame format (one frame for each concentric track on the face of the disk 10) has the advantage in that one video frame will be continuously broadcast for as long as one of the transducer heads 226 remains located above a particular track.

This is because the United States television broadcasting standard requires that successive frames of information be produced at one-thirtieth of a second interval and that each frame consist of two fields. One field corresponds to the odd-numbered scan lines of video cameras and receivers, while the other field corresponds to the even-numbered scan lines. By rotating the disk 10 at 1800 rpm, the disk 10 will make one revolution in one-thirtieth of a second which corresponds to the interval required by the U.S. broadcasting standard. Therefore, one 360° revolution of the disk 10 constitutes one frame with successive 180° portions constituting each field. A continuous picture is produced when a head 226 remains over one track and alternately and repetitively reads the information comprising one 180° field (odd-numbered scan lines) and the other field (even-numbered scan lines).

As indicated, the use of two heads 226 allows random access to the information recorded on the disk 10. This is achieved by having one head 226 remain over one track and continually read and reproduce the information contained thereon while the other head 226 independently moves to another disk 10 track. Since the accessing head 226 may be moved to any portion of the disk 10, before or after the track being reproduced, the information contained on the disk 10 may be retrieved in any order, regardless of the order in which the information was recorded. Once the accessing head 226 locates and is over the next track or frame to be reproduced, the shift between frames can be accomplished for all practical purposes instantaneously, without any discernible lag between frames.

To achieve this switching between frames without introducing a blank receiver screen or annoying interference between frames, it is necessary that the two heads be synchronized. It has been found that this synchronization may be achieved by spacing the heads 226 precisely 180° apart with respect to the circumference of the disk 10. This spacing corresponds to the spacing of the frame field and means that one head 226 will just reach the end of the second field (even-numbered scan lines) of its frame while the other head 226 just reaches the beginning of the first field (odd-numbered scan lines) of its selected frame.

Two heads 226 thus allow random access to any of the information recorded on the disk 10 and a spacing of these heads 226 at 180° permits this information to be read sequentially without screen blanking or interference between successive frames.

The description of the mechanical aspects of the drive mechanism 156 and the cooperation of this mechanism 156 with the cartridge 28 is now complete. It will be recognized that an apparatus has been provided which will protect the SSR disk 10 from environmental contaminants, mishandling and abuse while providing ready access to the information contained on the stretched recording surface of the disk.

Although a specific form of the invention has been described and illustrated in the drawings and the preceding description is drawn in specific terms for the purpose of describing this preferred form of the invention, the description is not intended to limit the scope of the invention which is defined in the appended claims. It will be understood that various changes in the details and components which have been described and illustrated in order to explain the nature of this invention may be made by those skilled in the art within the principle and scope of the invention as expressed in the appended claims.

I claim:

1. A cartridge and disk assembly for use in combination with a disk drive mechanism, the cartridge and disk assembly comprising:
   a first shell including a perimetrical wall and defining a disk access aperture;
   a second shell including a perimetrical wall corresponding to said first shell wall and defining a disk access slot, said shells mating at said walls to define an interior volume;
   a recording disk disposed within said volume and including a circular sealing surface for engagement with said first shell adjacent said aperture; and
   rotatable locking means disposed between said disk and said second shell for selectively preventing movement of said disk with respect to said shells and releasing said disk, said locking means comprising flexible arm means movable between a first position adjacent the second shell and a second position adjacent said disk for urging said disk sealing surface into engagement with said first shell and maintaining said engagement.

2. A cartridge and disk assembly according to claim 1 wherein said second shell further includes a cam surface, said locking means further comprises a central body portion, and said arm means comprises a flexible arm extending from said central portion and terminating in a tip disposed adjacent said second shell cam surface, said cam surface guiding said tip and said flexible arm between said first and second positions upon rotation of said locking means.

3. A cartridge and disk assembly according to claim 2 wherein said first shell further includes a projecting plateau spaced from and parallel to said first shell and said locking means further comprises a positioning arm extending from said central portion and supported by said plateau so that said central portion is maintained adjacent said second shell and spaced from said first shell.

4. A cartridge and disk assembly according to claim 1 further including positioning means for positioning said locking means with respect to said second shell.

5. A cartridge and disk assembly according to claim 4 wherein said positioning means comprises a secondary wall surrounding said aperture and confining said locking means.

6. A cartridge and disk assembly according to claim 4 wherein said second shell defines a hole and said positioning means comprises a bearing extending from said locking means into said hole.

7. A cartridge and disk assembly according to claim 1 wherein said disk drive mechanism includes engagement means for rotating said locking means and said locking means further comprises lug means projecting outside said shells for contacting said engagement means.

8. A cartridge and disk assembly according to claim 7 wherein said lug means comprises an arcuate arm terminating in a substantially perpendicular lug projecting outside said shells for contact with said engagement means and relative movement with respect to said shells, said relative movement resulting in rotation of said locking means.

9. A cartridge and disk assembly according to claim 1 wherein said locking means further comprises slot cover means for closing said slot upon rotation of said locking means to said second position.

10. A cartridge and disk assembly according to claim 9 wherein said locking means further comprises a central body portion and said slot cover means comprises an arm extending radially from said body portion.

11. A cartridge and disk assembly according to claim 1 wherein said shells define a sensing aperture and said cartridge and disk assembly further includes means within said shells for selectively presenting a reflective surface to said aperture and wherein said drive mechanism includes detection means for detecting through said aperture the presence of said reflective surface.

12. A cartridge and disk assembly according to claim 11 wherein said means for presenting a reflective surface comprises a lever disposed within said shells having a reflective surface and movable between positions presenting said reflective surface to said sensing aperture and removing said reflective surface from said aperture.

13. A cartridge and disk assembly according to claim 12 wherein said lever further includes grip means for manually moving said lever between said positions from outside said shells and detent means for retaining said lever in either of said positions.

14. A cartridge and disk assembly according to claim 1 wherein said locking means further comprises latch means cooperating with said second shell for releasably preventing rotation of said locking means from said second position.

15. A cartridge and disk assembly according to claim 14 wherein said latch means comprises a raised button and said second shell further defines a latch aperture releasably receiving said button upon rotation of said locking means to said second position to prevent rotation of said locking means.

16. A disk drive mechanism for use in combination with a disk cartridge assembly including a shell surrounding a rotatable disk and locking means for selectively preventing movement of said disk with respect to said shell upon rotation of said locking means, which disk cartridge assembly may be inserted into said drive mechanism, said drive mechanism comprising:
   turntable means for rotating said disk;
   pivotal frame means disposed above said turntable means for receiving said disk cartridge assembly and positioning said disk with respect to said turntable means;
   recording head transport means comprising a recording head and means for radially positioning said head with respect to said disk; and
   engagement means for rotating said locking means.

17. A disk drive according to claim 16 wherein said locking means comprises a lug extending outside said shell and said engagement means comprises at least one stud contacting and arresting movement of said lug to effect relative motion between said lug and said shell during insertion or removal of said cartridge assembly into or from said drive.

18. A disk drive according to claim 17 wherein said engagement means comprises a stationary stud and a retractable stud located before said stationary stud with respect to the direction of cartridge assembly insertion into said drive, said stationary stud arresting movement of said lug upon insertion of said cartridge into said drive and said retractable stud arresting movement of said lug upon removal of said cartridge assembly from said drive.

* * * * *